(12) United States Patent
Fink

(10) Patent No.: US 8,371,324 B1
(45) Date of Patent: Feb. 12, 2013

(54) COLLAPSIBLE SUPERSONIC INLET CENTERBODY

(75) Inventor: Lawrence E. Fink, Renton, WA (US)

(73) Assignee: The Boeing Company, Chicago, IL (US)

( * ) Notice: Subject to any disclaimer, the term of this patent is extended or adjusted under 35 U.S.C. 154(b) by 906 days.

(21) Appl. No.: 12/487,863

(22) Filed: Jun. 19, 2009

(51) Int. Cl.
*F02B 27/00* (2006.01)
(52) U.S. Cl. .................. 137/15.1; 137/15.2; 60/768
(58) Field of Classification Search .......... 60/768, 60/766, 767, 769; 137/15.1, 15.2; 244/53 B
See application file for complete search history.

(56) References Cited

U.S. PATENT DOCUMENTS

| | | | |
|---|---|---|---|
| 3,069,842 A | 12/1962 | Price | |
| 3,199,810 A | 8/1965 | Stroud et al. | |
| 4,307,743 A | 12/1981 | Dunn | |
| 4,745,740 A | 5/1988 | Dunn et al. | |
| 8,245,516 B2 * | 8/2012 | Song et al. | 60/771 |
| 2009/0288711 A1 * | 11/2009 | Alvi | 137/1 |

* cited by examiner

*Primary Examiner* — Ehud Gartenberg
*Assistant Examiner* — Vikansha Dwivedi
(74) *Attorney, Agent, or Firm* — Felix L. Fischer

(57) ABSTRACT

A collapsible flow control structure for an axisymmetric inlet employs trapezoidal alternating actuated and non-actuated strips having leading edges hinged to a missile forebody and free trailing edges extending into an inlet aperture, the strips positionable to form a variable angle frustum of a cone. An interengagement mechanism secures adjacent strips and actuators are attached to an inner surface of the actuated strips for urging the strips between a collapsed, retracted position for a first angle frustrum to an extended position for a second angle frustrum for aerodynamic flow control.

16 Claims, 9 Drawing Sheets

COLLAPSIBLE SUPERSONIC INLET CENTERBODY

BACKGROUND INFORMATION

1. Field

Embodiments of the disclosure relate generally to the field of supersonic aerodynamic inlets and more particularly to embodiments for generally axially symmetric chin or annular inlets with variable geometry provided by collapsing interleaved strips with alternate actuation.

2. Background

Inlet integration in supersonic cruise missile propulsion systems using gas-turbine engines is a significant challenge due to the broad operating speed range from subsonic to Mach 4. The additional requirements for light-weight, low-cost, and compactness due to launcher-imposed size constraints conflict with the need for high efficiency and low-drag which further exacerbates the difficulty in system design. Lower drag and higher efficiency benefits mission effectiveness through greater payload weight, longer range or higher speed.

An inlet needs to supply an airflow rate equal to or greater than that required by the engine. The excess flow must be either bypassed via a duct leading to the engine exhaust nozzle or through overboard exits, or spilled around the inlet cowl. Drag forces arise from the failure to employ the potentially captured flow to produce thrust from the engine. The state-of-the-art approach to supersonic missile inlet design usually involves a fixed-geometry design sized for the maximum capture area requirement set by the engine, and efficiency (total pressure recovery) optimized for the most critical thrust operating point. Certain variable geometry axisymmetric inlet concepts use either a translating or expanding centerbody. Alternative concepts include opening annular slots or other air inlet apertures to change the internal area contraction ratio for inlet "start" conditions.

Significant drag and efficiency penalties result at off-design flight conditions with fixed geometry inlets compared to what may be obtained with a variable geometry inlet. Excess air flow is usually bypassed around the engine with a drag penalty due to air flow energy loss associated with the inlet terminal normal shock and duct friction. Inlet internal contraction ratio, defined as the open area of the inlet divided by the area of the inlet throat, is limited by the ability to "start" at a certain Mach number. "Starting" can be defined as a stable condition in which the flow is supersonic at the cowl inlet lip and the terminal normal shock wave is located downstream of the inlet throat (i.e., the minimum cross-sectional area of the inlet duct).

An inlet has a limited internal contraction ratio at a given flight Mach number to allow self-start. Once started, the internal contraction ratio can be increased to a higher value. Increased internal contraction ratio results in a lower cowl angle (the angle of the interior and exterior surfaces of the inlet cowl relative to the horizontal) which decreases drag or increases efficiency for a given cowl angle.

Variable geometry inlet concepts use a mechanism that is relatively heavy, costly, complex and occupies significant volume. Such variable geometry inlets have high actuation forces which require bulky and expensive actuators. Such inlets also typically have trailing surfaces aft of the point of maximum diameter to provide a continuous surface with added associated weight and volume.

Two-dimensional inlet configurations have been provided for achieving the desired design efficiencies. However, some air vehicle concepts may require semi-cylindrical "chin" or "eyebrow" or full cylindrical axisymmetric inlets due to launcher interface dimensional constraints, or requirements for lower weight or drag.

It is therefore desirable to provide a variable geometry inlet with lightweight, low cost and reduced complexity for axisymmetric inlets.

SUMMARY

Exemplary embodiments provide a collapsible flow control structure for an axisymmetric inlet employing trapezoidal alternating actuated and non-actuated strips having leading edges hinged to a missile forebody and free trailing edges extending into an inlet aperture, the strips positionable to form a variable angle frustum of a cone. An interengagement mechanism secures adjacent strips and actuators are attached to an inner surface of the actuated strips for urging the strips between a collapsed, retracted position for a first angle frustrum to an extended position for a second angle frustrum for aerodynamic flow control.

In one configuration, each of the actuated strips incorporated an indented portion on each lateral edge and the outboard portion of an adjacent lateral of each non-actuated strip is received overlaying the indented portion. The interengagement mechanism includes a pin extending from an inner surface of each non-actuated strips received through a slot in the adjacent actuated strip. A washer receives the pin and a spring intermediate a head of the pin and the washer resiliently urges the washer against the inner surface of the actuated strip.

Exemplary actuators for the actuated strips employ a shape memory alloy and extension spring and further a position sensor is incorporated for providing position feedback to the actuator.

The features, functions, and advantages that have been discussed can be achieved independently in various embodiments of the present invention or may be combined in yet other embodiments further details of which can be seen with reference to the following description and drawings.

DETAILED DESCRIPTION

Figure 1:
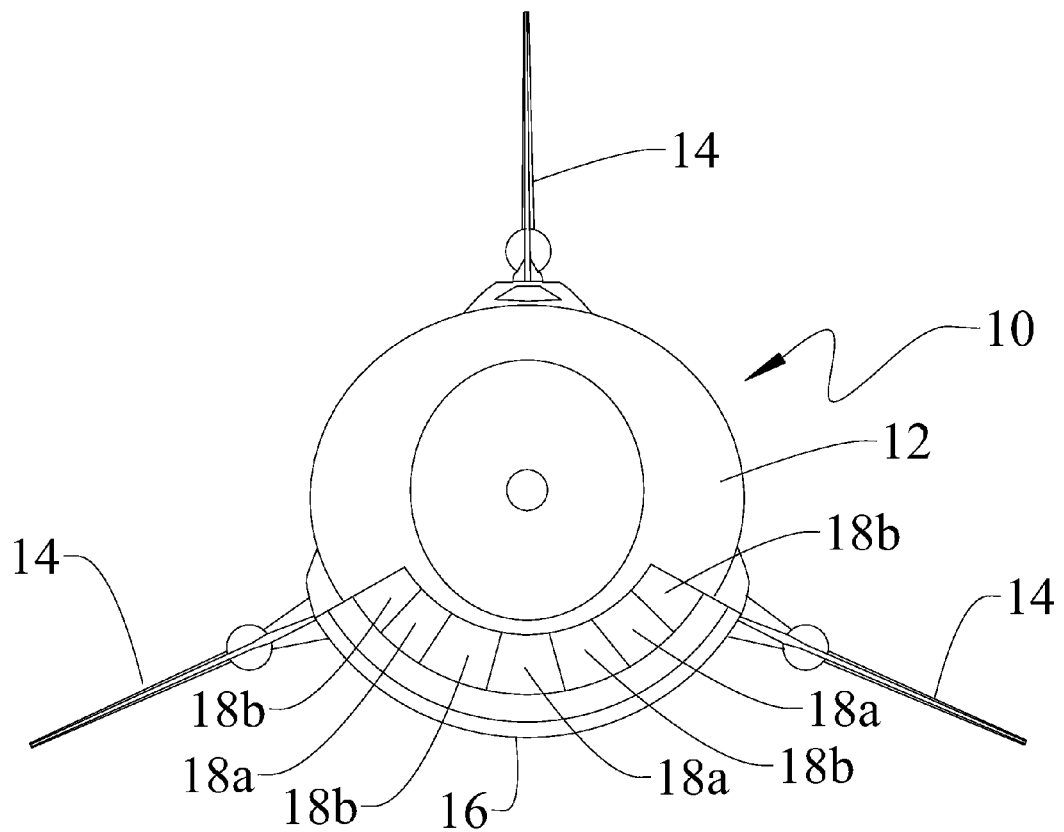
FIG. 1 is a front view of a supersonic missile employing an axisymmetric chin inlet with an exemplary embodiment.
Figure 2:
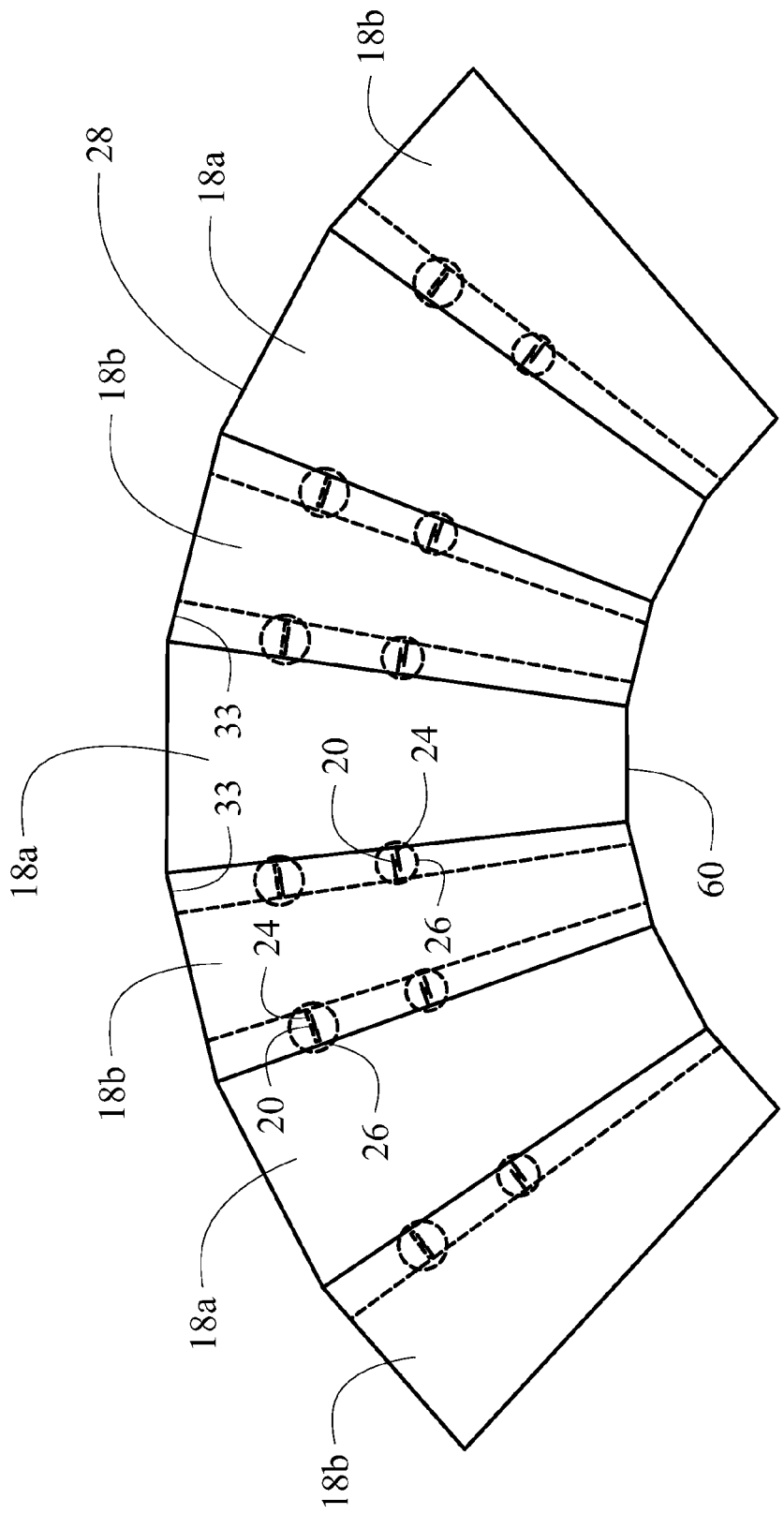
FIG. 2 is a front view of the trapezoidal actuated and overlaid non-actuated strips with the interengagement mechanisms.

The embodiments described herein demonstrate a collapsible interleaved strip structure for aerodynamic flow control in an axisymmetric inlet such as that disclosed in FIG. 1 for a cruise missile application. The missile 10 employs a substantially cylindrical fuselage 12 with aerodynamic control surfaces 14. An axisymmetric chin inlet 16 for a turbine engine carried in the fuselage 12 employs alternating actuated and passive non-actuated strips 18a and 18b for control of flow into the inlet. The strips 18a and 18b as shown in FIG. 2 are overlayed substantially trapezoidal planforms which are positionable to achieve a variable angle frustum of a cone, as will be described in greater detail subsequently. Outboard corners of the trapezoids may be clipped to minimize aliasing of the edges. To minimize the number of actuators required, intermediate non-actuated sealing strips 18b span the distance between actuated strips 18a.

Figure 3:
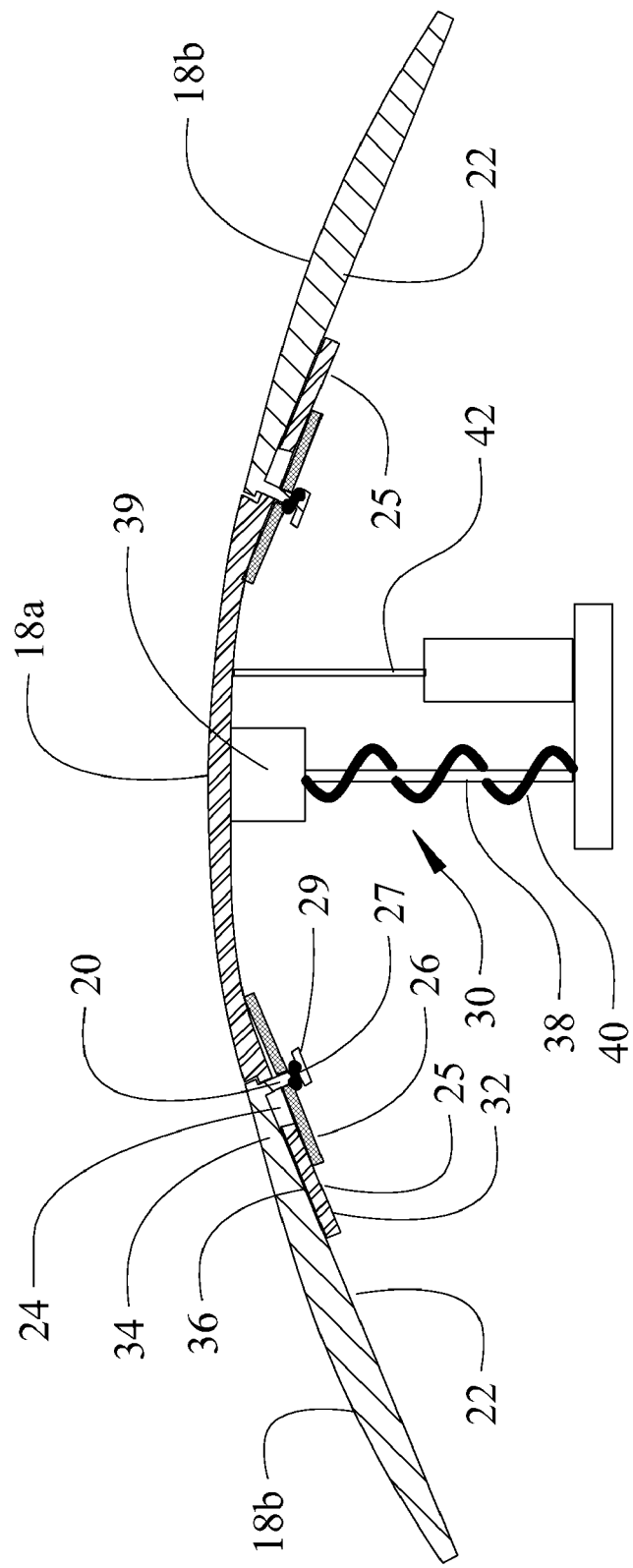
FIG. 3 is a section view of an actuated strip and two adjacent non-actuated strips with the associated actuator in the collapsed position.

As best seen in FIG. 3, which shows one actuated strip 18a and adjacent non-actuated strips 18b, an interengagement mechanism is provided for the actuated and non-actuated strips by pins 20 extending from the inner surface 22 of the non-actuated strips that are received through slots 24 in the actuated strip 18a. Resiliently supported washers 26 are urged against the inner surface 25 of the actuated strips 18a which maintain the sealing non-actuated strips 18b in intimate contact to maintain a contour for efficient operation and minimize leakage. The aft edges 28 (as shown on FIG. 2) of the strips 18a, 18b are free and unconnected to any trailing surface extending into the inlet as will be described in greater detail subsequently with respect to FIG. 5. In FIG. 3, the strips have been positioned by actuator assembly 30 in a maximum collapsed or retracted position overlapping the actuated strips 18a and non-actuated strips 18b to their greatest extent and placing the pins 20 at a first extent of slot 24. In this position, a conical frustum with a first angle is formed.

For the embodiment shown, the actuated strips 18a have indented portions 32 on each lateral edge to receive the outboard portions 34 of the overlayed non-actuated strips 18b. The outer surface 36 of the indented portions of the actuated strips maintains intimate contact with the inner surface 22 of the non-actuated strips with aerodynamic pressure urging the non-actuated strips 18b against the actuated strips 18a and the resiliently mounted washers 26 urging the actuated strips 18a against the non-actuated strips 18b as previously described. As mentioned previously with respect to the substantially trapezoidal planform of the actuated strips 18a, the outboard corners of the indented portions 32 are clipped creating chamfers 33 in the aft edges 28 of the actuated strips for alignment with the overlapping outboard portions 34 of the adjacent non-actuated strips 18b. As shown in FIG. 2, two sets of engagement mechanisms with associated slots 24, pins 20 and washers 26 are employed on each edge of the actuated strips for support of the adjacent non-actuated strips. The washer diameter and slot length are determined based on the radial distance from the hinged leading edge of the strips and the range of angular deflection of the strips. While two sets of engagement mechanisms on each edge are shown for the embodiment in the drawings, more or fewer engagement mechanisms per edge may be employed in alternative embodiments depending on the overall length and rigidity of the strips and the aerodynamic sealing requirements.

Figure 4:
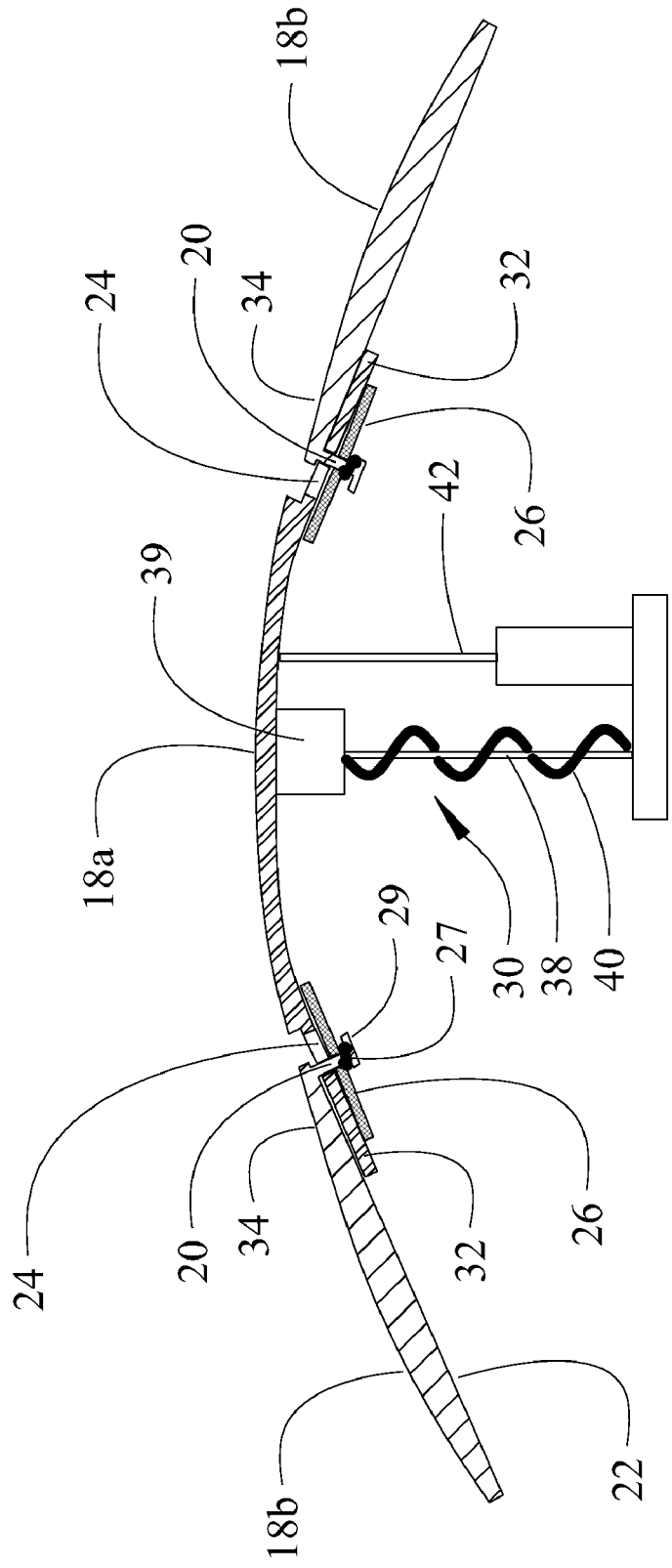
FIG. 4 is a section view of the actuated strip and two adjacent non-actuated strips of FIG. 3 in the extended position.

FIG. 4 shows the strips 18a. 18b in the fully extended position where actuated strip 18a has been extended by the actuator 30 thereby sliding indented portions 32 relative to the outboard portions 34 of the non-actuated strips 18b to reduce the overlap of strips 18a and 18b to a minimum and placing pins 20 at a second extent of slot 24. In this configuration, the strips 18a, 18b create a conical frustum with a second angle. Washers 26 trail the pins 20 and maintain coverage over the slots 24 to enhance the aerodynamic seal between the adjacent strips and reduce or eliminate leakage. For the embodiments shown in FIGS. 3 and 4, springs 27 concentrically receive the pins 20 and are constrained between the washers 26 and pin heads 29 to resiliently urge the washers against the inner surface 22 of the actuated strip 18a.

In FIGS. 3 and 4, as an exemplary embodiment, a shape memory alloy rod 38 driven by an actuation controller or exciter 39 with an extension spring 40 is employed as the actuator 30 to move the actuated strips 18a. In alternative embodiments, a geared electric motor with simple linkage may be used. A position sensor 42 (such as a linear potentiometer) provides position feedback to the exciter 39. A microprocessor or other controller in the missile may be employed to determine optimum strip positioning for the desired aerodynamic performance at flight conditions and providing appropriate control signals to the actuator 30.

Figure 5A:
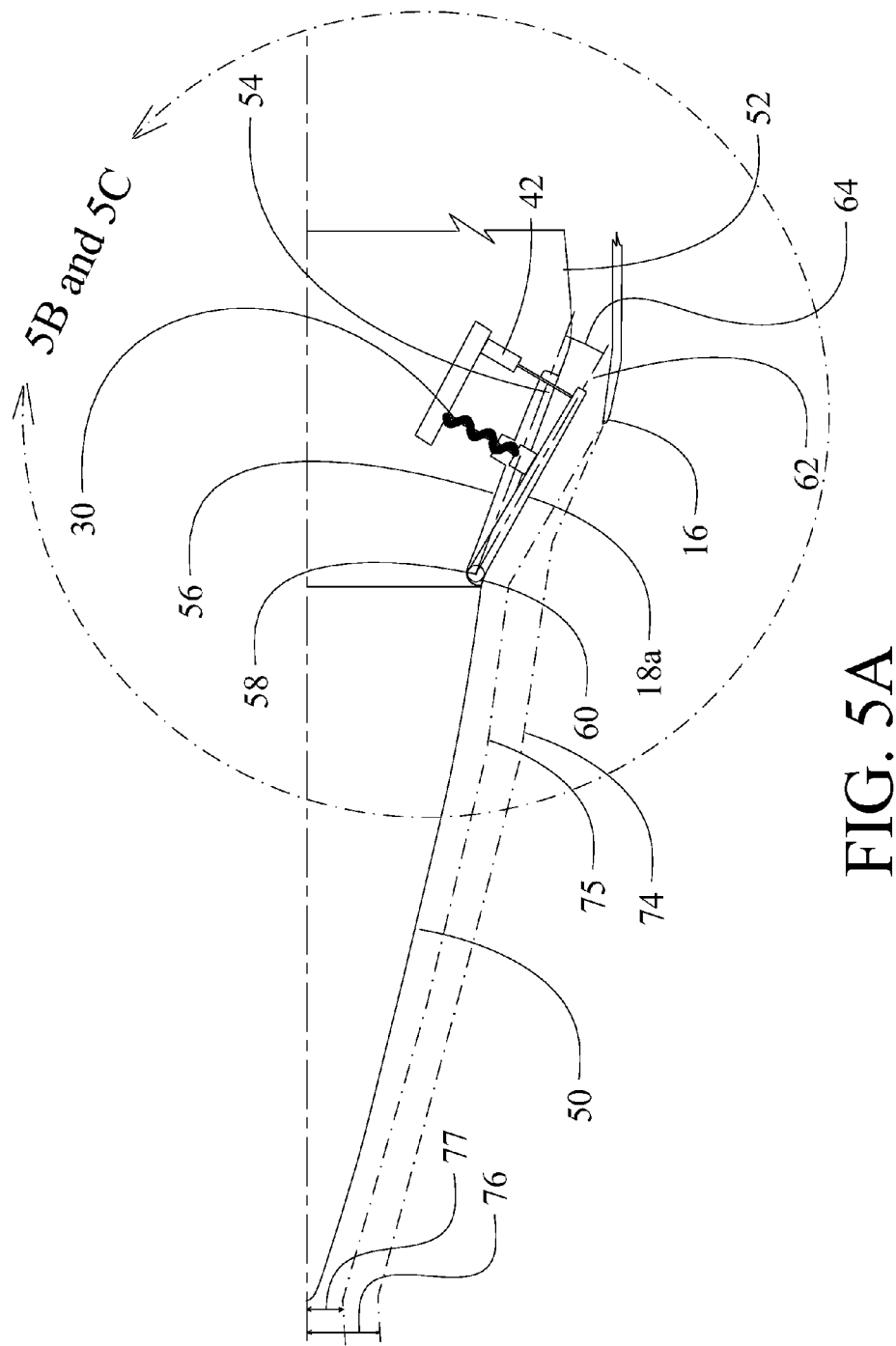
FIG. 5A is a side partial section view of the supersonic missile forebody and inlet with the exemplary embodiment.

FIG. 5A shows a partial section side view of the missile forebody 50 of the missile and the chin inlet 16. Transition from the missile forebody to the inner body 52 of the inlet is provided by a substantially conical frustum 54. Indented portions 56 at the forward extent of frustum 54 provide relief for placement of hinges 58 at the forward edges 60 of the strips 18a, 18b and to receive the collapsed or retracted strips. As shown in FIGS. 3 and 4, the strips 18a, 18b are curved to match the profile of the frustrum. While the depicted embodiments employ a simple conical shape as demonstrative, shaping of the missile forebody 50, frustrum 54, and inner body 52 in combination with strips 18a, 18b to accommodate conical or bi-conic inlets may be implemented. Alternatively, shaping for isentropic compression may also be employed. The embodiments disclosed herein are compatible with these inlet design options.

The angular displacement shown in FIG. 5A has been exaggerated for clarity and the curvature of the strips 18a, 18b may be averaged for a curvature in the extended and collapsed positions. Actual angular variation required to achieve the desired aerodynamic conditions is quite small relative to the other physical dimensions of the strips. Adjustment of the actuated strips 18a by the actuators 30 varies the aperture 62 of the chin inlet 16 for adjustment of the inlet area to accommodate aerodynamic requirements by altering the angle 64 of the variable conical frustum created by the strips 18a, 18b. In certain applications, however, the strips 18a, 18b may be employed to entirely close the inlet aperture 62 to reduce drag during captive carry externally on a launching aircraft or during rocket boost from a shipboard application as examples. In that case, strips 18a and 18b would expand all the way to the lip of inlet 16 in the fully extended position.

Figure 6:
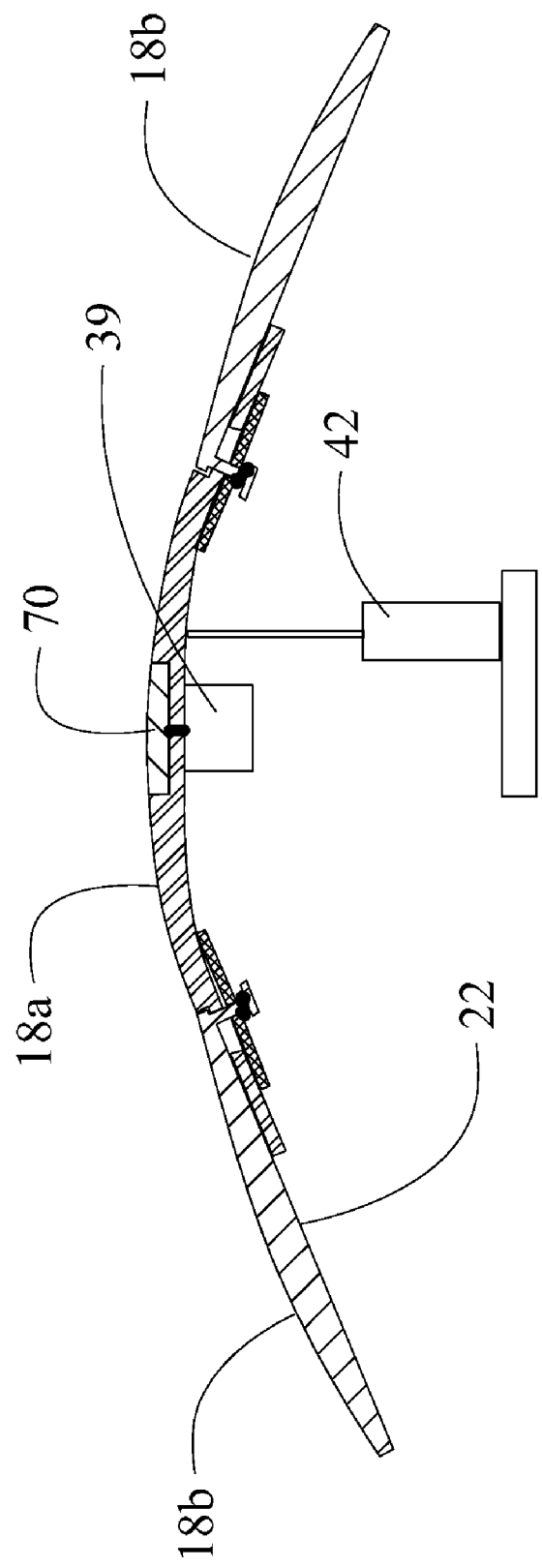
FIG. 6 is a section view of an actuated strip and two adjacent non-actuated strips for a second embodiment with an alternative actuator in the collapsed position.
Figure 7:
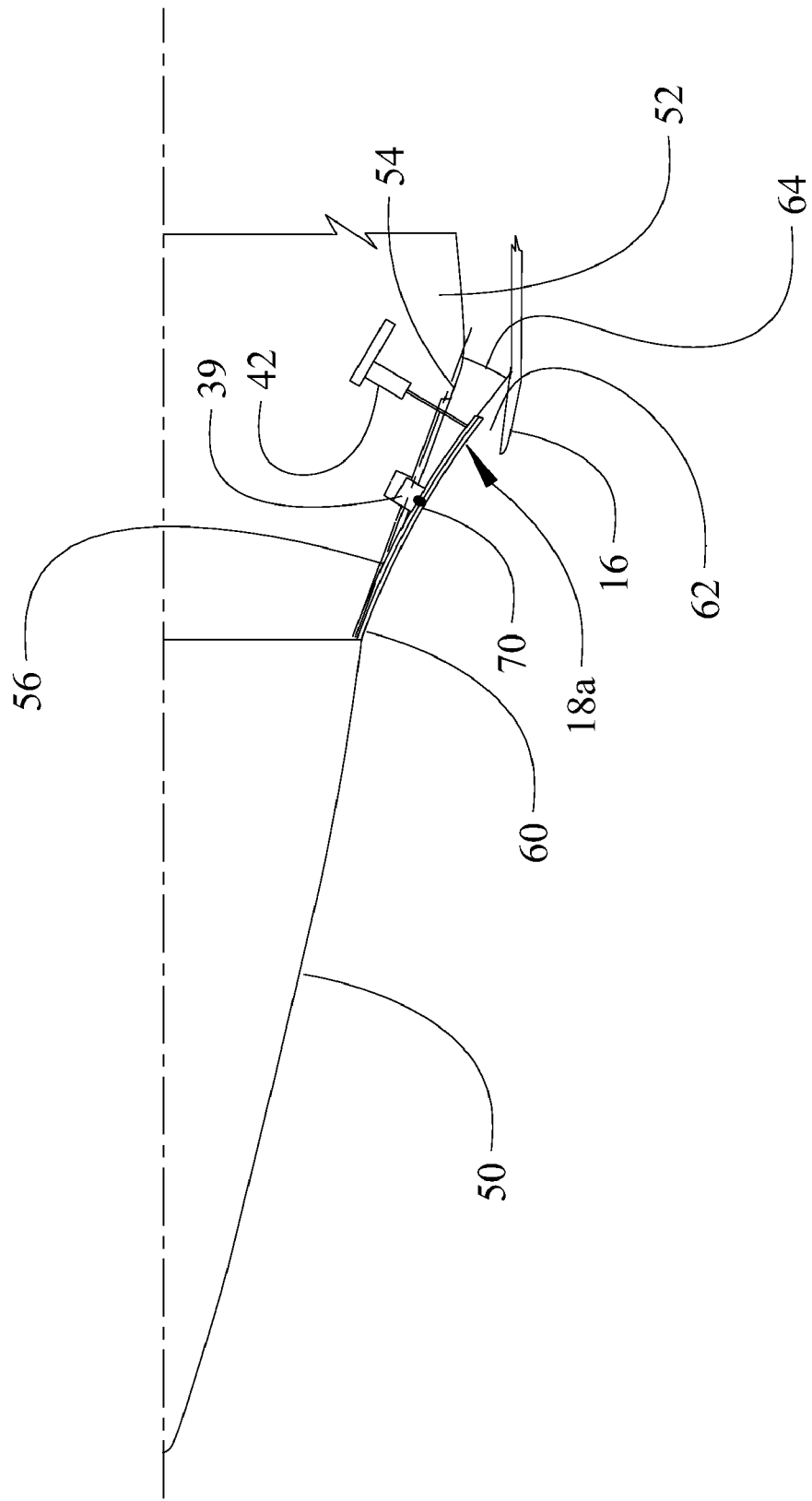
FIG. 7 is a side partial section view of the supersonic missile forebody and inlet for the second embodiment as shown in FIG. 6.

An alternative embodiment is shown in FIGS. 6 and 7 which employs an actuator formed by a shape memory alloy bar 70 which is adhered or otherwise attached to the actuated strip 18a. Exciter 39 activates the shape memory alloy strip creating a curvature in either a portion or the entire extent of the bar to alter the angle of the actuated strip 18a relative to the frustrum 54 for modification of the inlet aperture. The curvature of FIG. 7 is again exaggerated to demonstrate the intent of the embodiment while actual curvature and angular variation will be minimal. This configuration may allow the elimination of a hinge at the forward edges of the strips 18a and 18b instead relying on the elasticity of the material of the strips to flex to create the angular displacement. While attachment of the shape memory alloy bar to the top surface of the actuated strip 18a is shown in the drawings, attachment to the lower surface or imbedding the shape memory alloy within the strip would provide alternative embodiments.

In operation, the present embodiments provide for hinged or flexible attachment of the leading edges of a series of actuated trapezoidal strips and an overlapped set of intermediate non-actuated strips to a missile forebody with free trailing edges of the strips extending into the inlet aperture. The strips are then positioned using actuators on the actuated strips with the overlaid intermediate non-acutated strips slidingly engaged to form a variable angle frustum of a cone. Collapsed to a minimum angle for a minimum radius conical frustrum the strips provide a full area inlet while expanded to a maximum angle, the strips for a conical frustrum reducing the inlet area which diverts flow around the inlet. Use of shape memory alloy actuation allows flexing or rotating of the strips from the first minimum angle to the second maximum angle.

Figure 5B:
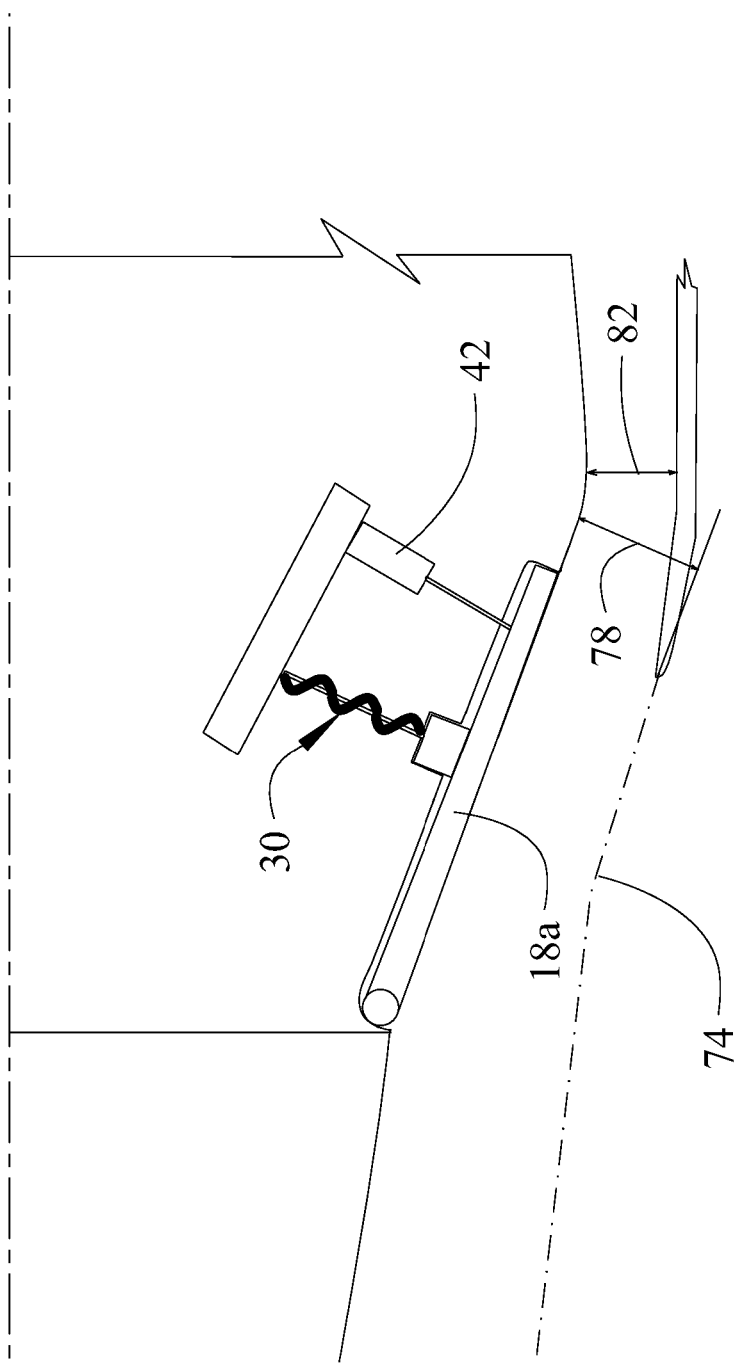
FIGS. 5B and 5C are expanded side partial section views as shown in FIG. 5A with the strips in the retracted and extended position respectively.
Figure 5C:
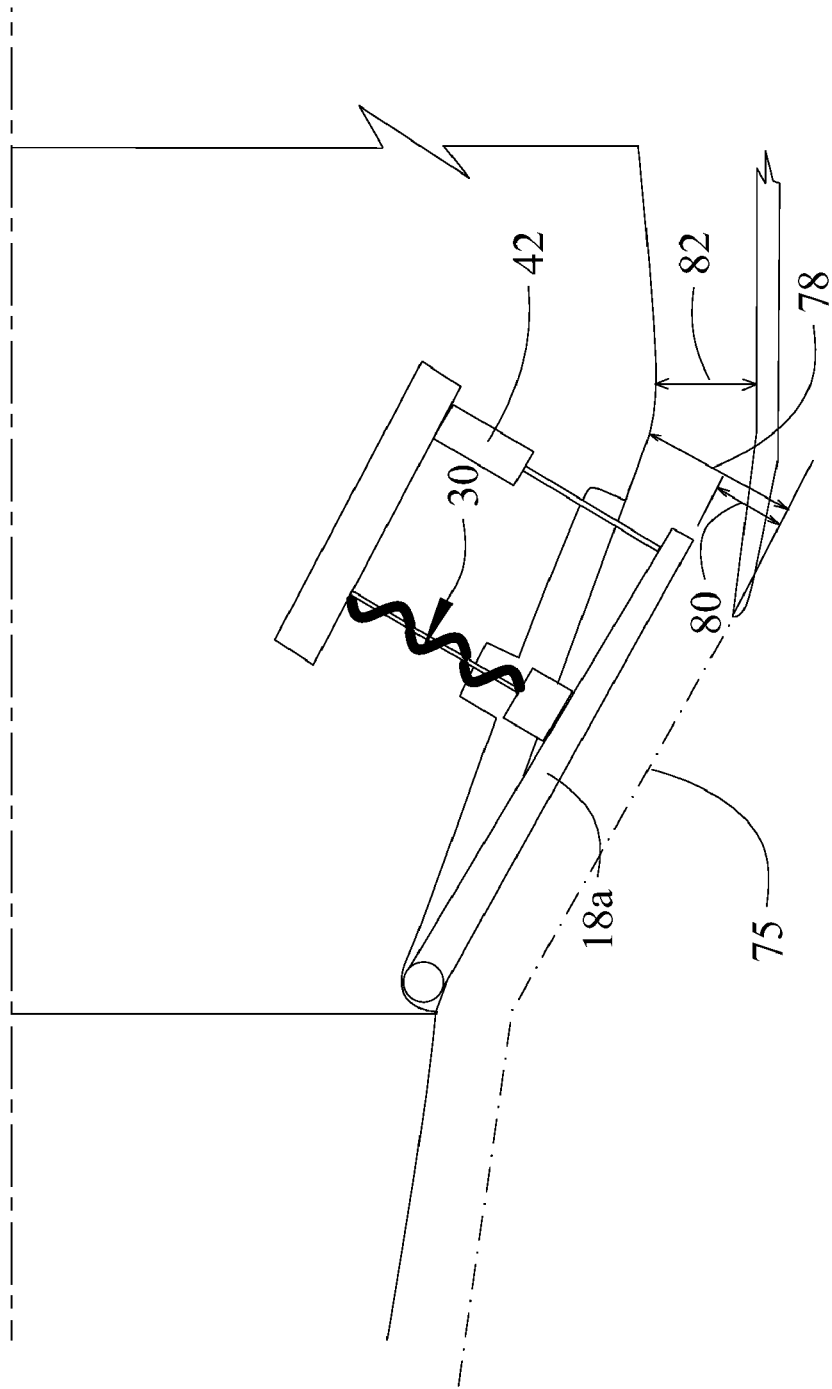

The pivoting strips change both external and internal contraction ratio when they rotate. As shown in FIGS. 5B and 5C for the strips 18a, 18b, in the retracted and extended positions respectively, the external area contraction ratio defined with respect to a streamtube 74 with an area having freestream radius $h_S$ 76 (shown in FIG. 5A) and the inlet annulus area associated with $h_r$ 78 in the retracted position changes to streamtube 75 with a freestream radius $h_r$ 77 (shown in FIG. 5A) and inlet annulus area associated with h 80 in the extended position of strips 18a, 18b, resulting in external contraction ratio variation from $h_s/h_r$ to $h_r/h$. Similarly, the internal area contraction ratio varies with respect to the throat area height $h_t$ 82 from $h_r/h_t$ to $h/h_r$. The embodiment shown has lower drag and higher efficiency than fixed geometry inlets due its ability to divert supersonic airflow around the cowl while varying the internal contraction ratio, and enabling a lower cowl angle. The structure in the disclosed embodiment has low actuation forces at the lower deflection angles due to natural pressurization on the inner surface 22 of the moveable strips 18a, 18b so that lower cost and lower weight actuators can be used. Unlike prior art axisymmetric variable geometry concepts, the present embodiment trades external compression for internal compression as the overlayed strips move for unique advantages of effective airflow control, inlet efficiency, and low drag.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A collapsible flow control structure for an axisymmetric inlet comprising:
    a plurality of strips having leading edges attached to a cylindrical missile forebody and free trailing edges extending into an inlet aperture, said plurality of strips having substantially trapezoidal alternating actuated and non-actuated strips, said non-actuated strips overlayed on said actuated strips for relative sliding motion and positionable to form a variable angle frustum of a cone;
    an interengagement mechanism for securing adjacent strips in the plurality;
    a plurality of actuators attached to an inner surface of the actuated strips for urging the strips between a collapsed, retracted position for a first angle frustrum to an extended position for a second angle frustrum for aerodynamic flow control.

2. The flow control structure of claim 1 wherein each of the actuated strips incorporate an indented portion on each lateral edge and the outboard portion of an adjacent lateral of each non-actuated strip is received overlaying the indented portion.

3. The flow control structure of claim 2 wherein the interengagement mechanism comprises:
    a pin extending from an inner surface of each non-actuated strips received through a slot in the adjacent actuated strip;
    a washer receiving the pin and resiliently urged against an inner surface of the actuated strip.

4. The flow control structure of claim 3 wherein the pin incorporates a head and further comprising a spring intermediate the head and the washer for resiliently urging the washer against the inner surface of the actuated strip.

5. The flow control structure of claim 1 wherein each of the plurality of actuators comprises a shape memory alloy and extension spring and further comprising a position sensor for providing position feedback to the actuator.

6. A propulsion air flow control system for a supersonic air vehicle comprising:
    an axisymmetric inlet having an aperture;
    a substantially cylindrical missile forebody extending forward of the inlet;
    a plurality of strips having leading edges hinged to the missile forebody and free trailing edges extending into the inlet aperture, said plurality of strips having substantially trapezoidal alternating actuated and non-actuated strips, said non-actuated strips overlayed on said actuated strips for relative sliding motion and positionable to form a variable angle frustum of a cone;
    an interengagement mechanism for securing adjacent strips in the plurality;
    a plurality of actuators attached to an inner surface of theactuated strips for urging the strips between a collapsed, retracted position for a first angle frustrum to an extended position for a second angle frustrum for aerodynamic flow control.

7. The propulsion air flow control system of claim 6 wherein each of the actuated strips incorporate an indented portion on each lateral edge and the outboard portion of an adjacent lateral of each non-actuated strip is received overlaying the indented portion.

8. The propulsion air flow control system of claim 7 wherein the interengagement mechanism comprises:
    a pin extending from an inner surface of each non-actuated strips received through a slot in the adjacent actuated strip;
    a washer receiving the pin and resiliently urged against an inner surface of the actuated strip.

9. The propulsion air flow control system of claim 8 wherein the pin incorporates a head and further comprising a spring intermediate the head and the washer for resiliently urging the washer against the inner surface of the actuated strip.

10. The propulsion air flow control system of claim 6 wherein each of the second plurality of actuators comprises a shape memory alloy and extension spring and further comprising a position sensor for providing position feedback to the actuator.

11. A propulsion air flow control system for an air vehicle comprising:
    an axisymmetric chin inlet having an aperture;
    a missile forebody extending forward of the inlet;
    a plurality of alternating trapezoidal actuated and non-actuated strips each attached to the missile forebody with a hinge, each of the actuated strips incorporating an indented portion on each lateral edge and the outboard portion of an adjacent lateral of each non-actuated strip is received overlaying the indented portion for relative sliding motion said plurality of strips positionable to form a variable angle frustum of a cone;

an interengagement mechanism for securing adjacent strips having a pin extending from an inner surface of each non-actuated strips received through a slot in the adjacent actuated strip and a washer receiving the pin, a spring intermediate a head of the pin and the washer for resiliently urging the washer against the inner surface of the actuated strip and resiliently urged against an inner surface of the actuated strip;

a plurality of actuators having a shape memory alloy attached to an inner surface of the actuated strips and an extension spring for urging the plurality of strips between a collapsed, retracted position for a first angle conical frustrum to an extended position for a second angle conical frustrum for aerodynamic flow control.

12. A propulsion air flow control system for an air vehicle comprising:

an axisymmetric chin inlet having an aperture;

a missile forebody extending forward of the inlet;

a plurality of alternating trapezoidal actuated and non-actuated strips each flexibly attached to the missile forebody, each of the actuated strips incorporating an indented portion on each lateral edge and the outboard portion of an adjacent lateral of each non-actuated strip is received overlaying the indented portion for relative sliding motion said plurality of strips positionable to form a variable angle frustum of a cone;

an interengagement mechanism for securing adjacent strips in the plurality having a pin extending from an inner surface of each non-actuated strips received through a slot in the adjacent actuated strip and a washer receiving the pin, a spring intermediate a head of the pin and the washer for resiliently urging the washer against the inner surface of the actuated strip and resiliently urged against an inner surface of the actuated strip;

each actuated strip having a shape memory alloy attached to a surface of the actuated strips and an extension spring for urging the plurality of strips between a collapsed, retracted position for a first angle conical frustrum to an extended position for a second angle conical frustrum for aerodynamic flow control.

13. The propulsion air flow control system of claim 12 wherein the shape memory alloy is attached to an outer surface of the actuated strips for curving the actuated strips in the extended position.

14. A method for propulsion air flow control for an air vehicle having an axisymmetric inlet comprising:

attaching leading edges of a plurality of overlapping trapezoidal strips with alternating actuated and unactuated strips to a substantially cylindrical missile forebody with free trailing edges of the strips extending into an inlet aperture;

interengaging the actuated and unactuated strips;

extending the actuated strips to position said plurality of strips to form a first angle frustum of a cone; and, retracting the actuated strips to position said plurality of strips to form a second angle frustum of a cone to change both external and internal contraction ratio of the inlet.

15. The method of claim 14 wherein the step of attaching leading edges comprises:

hinging the leading edges of a plurality of actuated strips to the missile forebody and hinging the leading edges of a plurality of non-actuated strips overlaid intermediate the actuated strips.

16. The method of claim 14 wherein the steps of extending and retracting comprise flexing the actuated strips between the first angle frustrum and the second angle frustrum with a shape memory alloy.

* * * * *